(12) United States Patent
Iwashima (10) Patent No.: US 9,973,657 B2
(45) Date of Patent: May 15, 2018

(54) IMAGE FORMING APPARATUS AND IMAGE FORMING METHOD

(71) Applicant: KYOCERA Document Solutions Inc., Osaka (JP)

(72) Inventor: Yasuhiro Iwashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/388,347

(22) Filed: Dec. 22, 2016

(65) Prior Publication Data

US 2017/0180608 A1    Jun. 22, 2017

(30) Foreign Application Priority Data

Dec. 22, 2015    (JP) .................................. 2015-249478

(51) Int. Cl.
*H04N 1/44* (2006.01)

(52) U.S. Cl.
CPC ... *H04N 1/4433* (2013.01); *H04N 2201/0094* (2013.01)

(58) Field of Classification Search
None
See application file for complete search history.

(56) References Cited

U.S. PATENT DOCUMENTS

| 6,266,693 B1 * | 7/2001 | Onaga | G06F 3/1204 |
| | | | 358/1.1 |
| 8,429,402 B2 * | 4/2013 | Kathan | H04L 63/08 |
| | | | 358/1.1 |
| 2010/0064256 A1 * | 3/2010 | Esaki | H04N 1/00413 |
| | | | 715/825 |

FOREIGN PATENT DOCUMENTS

| JP | 2007-003900 A | 1/2007 |
| JP | 2009-248492 A | 10/2009 |

* cited by examiner

*Primary Examiner* — Paul F Payer
(74) *Attorney, Agent, or Firm* — Hawaii Patent Services; Nathaniel K. Fedde; Kenton N. Fedde (57) ABSTRACT

Provided is an image forming apparatus that is able to prevent a security environment from being changed due to maintenance work without an administrator user noticing. The image forming apparatus is an image forming apparatus that performs image formation, and includes a setting receiving unit that receives settings such as settings related to maintenance of the image formation, settings related to security, and an administrator user setting. The setting receiving unit receives all of the settings by a maintenance worker when the administrator user setting is unset, and prohibits receiving settings related to security by the maintenance worker when the administrator user setting is set.

5 Claims, 8 Drawing Sheets

| MAINTENANCE ITEMS | USAGE PERMISSION PERIOD |
|---|---|
| USB HOST LOCK | 2015/8/20/8:00 ~ 2015/8/20/12:00 |
| Import/Export | 2015/8/20/8:00 ~ 2015/8/20/12:00 |
| ... | ... |

IMAGE FORMING APPARATUS AND IMAGE FORMING METHOD

INCORPORATION BY REFERENCE

This application is based on and claims the benefit of priority from Japanese Patent Application No. 2015-249478 filed on Dec. 22, 2015, the contents of which are hereby incorporated by reference.

BACKGROUND

This disclosure relates to an image forming apparatus that is maintained by a maintenance worker.

An image forming apparatus may be delivered to a user after being set up by a maintenance worker. Therefore, the maintenance worker is given authority beforehand equivalent to that of an administrator user for performing maintenance work capable of changing all settings.

After an image forming apparatus has been delivered, the administrator user often performs security settings such as setting access authority, disabling USB connections and the like. This is because often confidential user information such as confidential documents, address books and the like is stored on the image forming apparatus.

Even in cases when a maintenance worker performs maintenance of an image forming apparatus in order to maintain performance of the image forming apparatus or to repair problems, measures must be taken to prevent leakage of confidential information. Therefore, methods such as allowing only certified maintenance workers to perform maintenance work, or outputting maintenance information to an external terminal belonging to a maintenance worker in order that maintenance information need not be printed have been proposed.

SUMMARY

The image forming apparatus of the present disclosure is an image forming apparatus that performs image formation, and includes a setting receiving unit that receives settings such as settings related to maintenance of the image formation, settings related to security, and an administrator user setting. The setting receiving unit receives all of the settings by a maintenance worker when the administrator user setting is unset. The setting receiving unit prohibits receiving settings related to security by the maintenance worker when the administrator user setting is set.

The image forming method of the present disclosure is an image forming method whereby an image forming apparatus performs image formation by a setting receiving unit receiving settings such as settings related to maintenance of the image formation, settings related to security, and an administrator user setting. In the image forming method, the setting receiving unit determines whether or not the administrator user setting is unset. The setting receiving unit receives all of the settings by a maintenance worker when it is determined that the administrator user setting is unset. The setting receiving unit prohibits receiving settings related to security by the maintenance worker when it is determined that the administrator user setting is set.

DETAILED DESCRIPTION

In the following, an embodiment of the present disclosure will be explained in detail with reference to the drawings. In the following explanation of an embodiment, the same reference numbers will be used for parts that have the same function.

Figure 1:
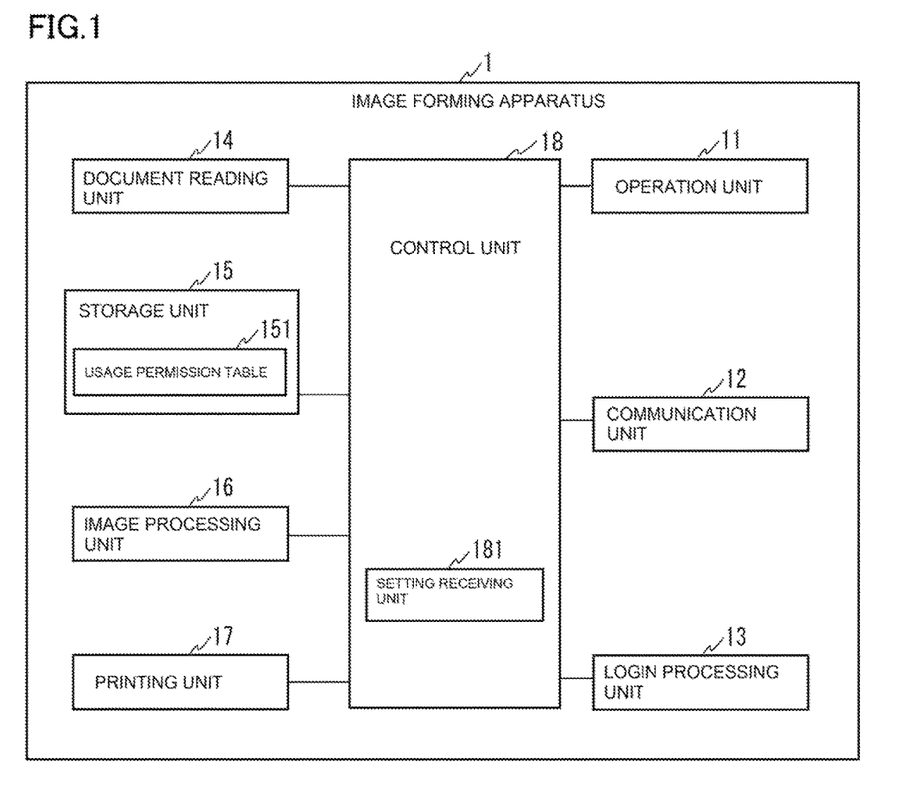
FIG. 1 is a functional block diagram illustrating the configuration of an image forming apparatus of an embodiment of the present disclosure.

The image forming apparatus 1 illustrated in FIG. 1 is a multifunction device having a copying function, a scanning function, a network communication function and the like. The image forming apparatus 1 includes an operation unit 11, a communication unit 12, a login processing unit 13, a document reading unit 14, a storage unit 15, an image processing unit 16, a printing unit 17, and a control unit 18.

The operation unit 11 includes a liquid-crystal display unit and operation buttons. The liquid-crystal display unit can display the state of the image forming apparatus 1, can display the image formation status and the number of copies, and can display maintenance screens for performing maintenance. The liquid-crystal display, functioning as a touch panel, can be used to perform various functions such as duplex printing, black and white reversal and the like, and to perform various settings such as a magnification rate setting, a density setting, maintenance settings and the like. As operation buttons, a start button that a user uses to give an instruction to start image formation, a stop/clear button that is used when interrupting image formation, a reset button that is used when resetting various settings of the image forming apparatus 1 to the default state, ten-key buttons and the like are provided.

The communication unit 12 has a function for transmitting and receiving various kinds of data to and from external terminals by way of a network.

The login processing unit 13 performs login verification of a user, allows login of a user that is successfully verified, and limits the functions of the image forming apparatus 1 that the user may use according to the authority given to the user.

The document reading unit 14 is a scanner that reads a document image by irradiating light onto a document that was supplied by a document feeding device, or a document that a user places on a platen glass, and receiving light that is reflected from that document.

The storage unit 15 is a storage means that stores image data that is read by the document reading unit 14, or image data that is received by the communication unit 12. Confidential information is also included in image data that is stored in the storage unit 15. An address book is also stored in the storage unit 15. An address book in which personal information is registered is also confidential information.

Figure 2:
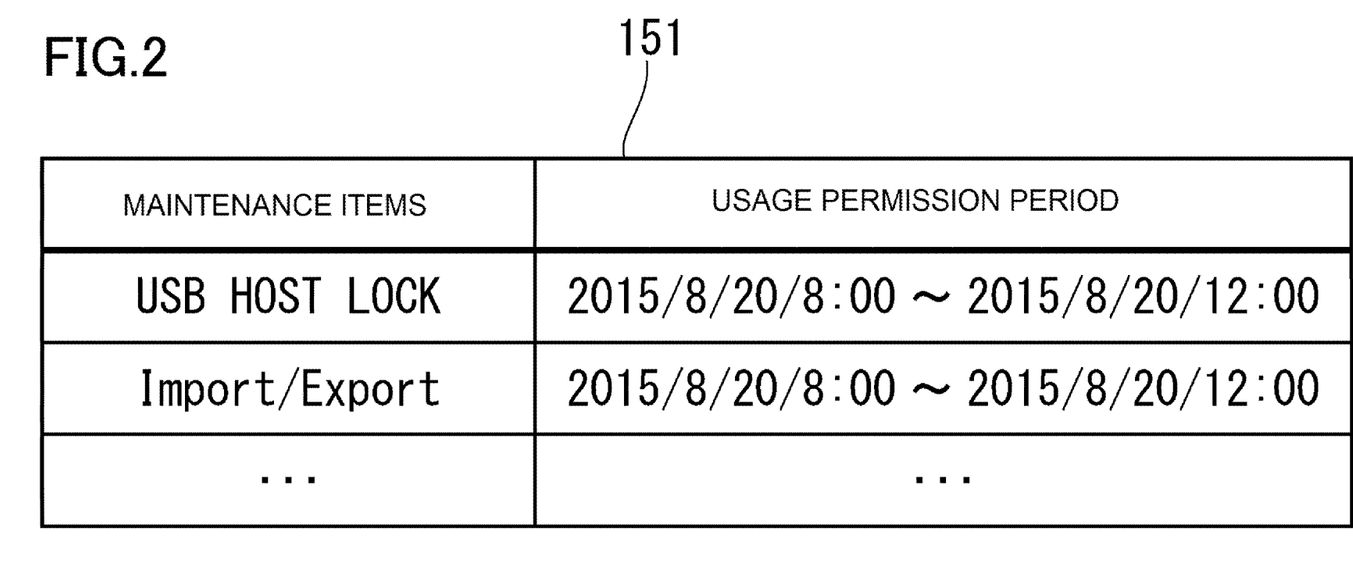
FIG. 2 is an example of the registration of a usage permission table illustrated in FIG. 1.

A usage permission table 151 is also stored in the storage unit 15. Maintenance items for which a maintenance worker is permitted to use by the administrator user are registered in the usage permission table 151. FIG. 2 illustrates an example of registration in the usage permission table 151. Maintenance items for which usage is permitted, and the periods for which usage of those items is permitted are registered in the usage permission table 151. Maintenance items of which the usage permission period has elapsed are automatically deleted from the usage permission table 151 by a setting receiving unit 181 as will be described later, and the authority given to the maintenance worker to use a maintenance item of which the usage permission period has elapsed is lost.

The image processing unit 16 performs specific image processing of image data. The image processing unit 16 performs processing such as an enlargement or reduction process, or an image improvement processing such as density adjustment, gradation adjustment and the like.

The printing unit 17 prints based on image data that is stored in the storage unit 15. For example, the printing unit 17 forms a latent image on the surface of a photosensitive drum based on image data that was read from the storage unit 15, performs image formation by using toner to make that latent image a toner image, transfers that toner image from the photosensitive drum to printing paper, fixes that toner image on the printing paper, and ejects the printing paper.

The control unit 18 is connected to the operation unit 11, the communication unit 12, the login processing unit 13, the document reading unit 14, the storage unit 15, the image processing unit 16 and the printing unit 17. The control unit 18 executes overall control of the image forming apparatus 1 according to specific instruction information that was inputted from the operation unit 11. The control unit 18 is an information processing unit such as a microcomputer that includes ROM (Read Only Memory), RAM (Random Access Memory) and the like. A control program for performing control of the image forming apparatus 1 is stored in ROM. The control unit 18 reads the control program that is stored in ROM, expands that control program in RAM, and performs overall control of the image forming apparatus 1 according to specific instruction information that is inputted from the operation unit 11.

The control unit 18 also functions as a setting receiving unit 181 that receives settings related to maintenance of the information formation, settings related to security, an administrator user setting and the like.

Figure 3:
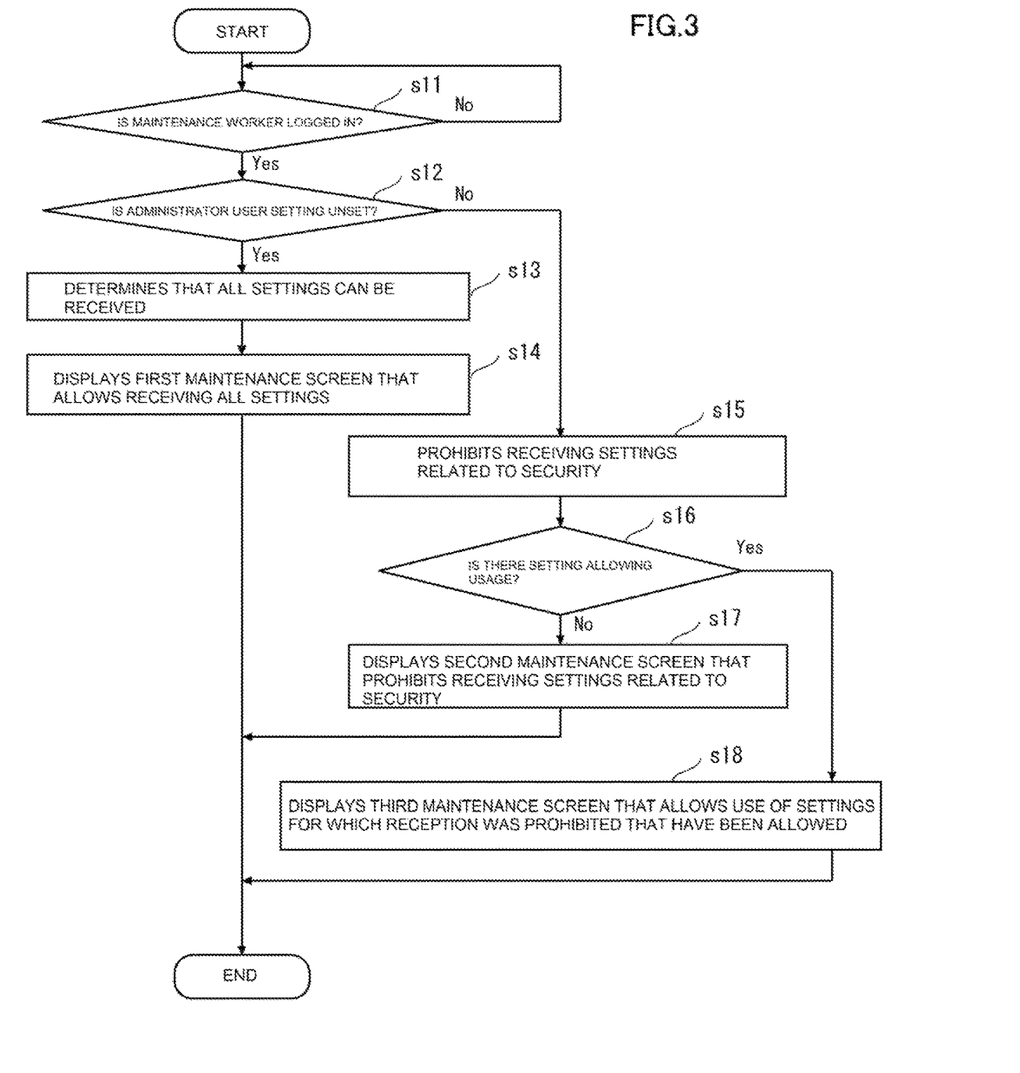
FIG. 3 is a flowchart illustrating the flow of processing by a maintenance management unit illustrated in FIG. 1.

The flow of processing by the setting receiving unit 181 will be explained in detail with reference to FIG. 3.

The setting receiving unit 181 waits until a maintenance worker logs in to the image forming apparatus 1 using a password for maintenance work (step s11, No in step s11). The password for maintenance work is set beforehand at the factory, and in order that a maintenance worker does not need to remember many passwords, the password is common for the image forming apparatus 1 series.

After a maintenance worker logs in by way of the login processing unit 13 (Yes in step s11), the setting receiving unit 181 determines whether or not the administrator user setting is unset (step s12).

When the administrator user setting is unset (Yes in step s12), the setting receiving unit 181 determines that it is possible to receive all settings (step s13), displays a first maintenance screen on which is possible to receive all settings (step s14), and ends this process. The factory setting is such that the administrator user setting is not set.

Figure 4:
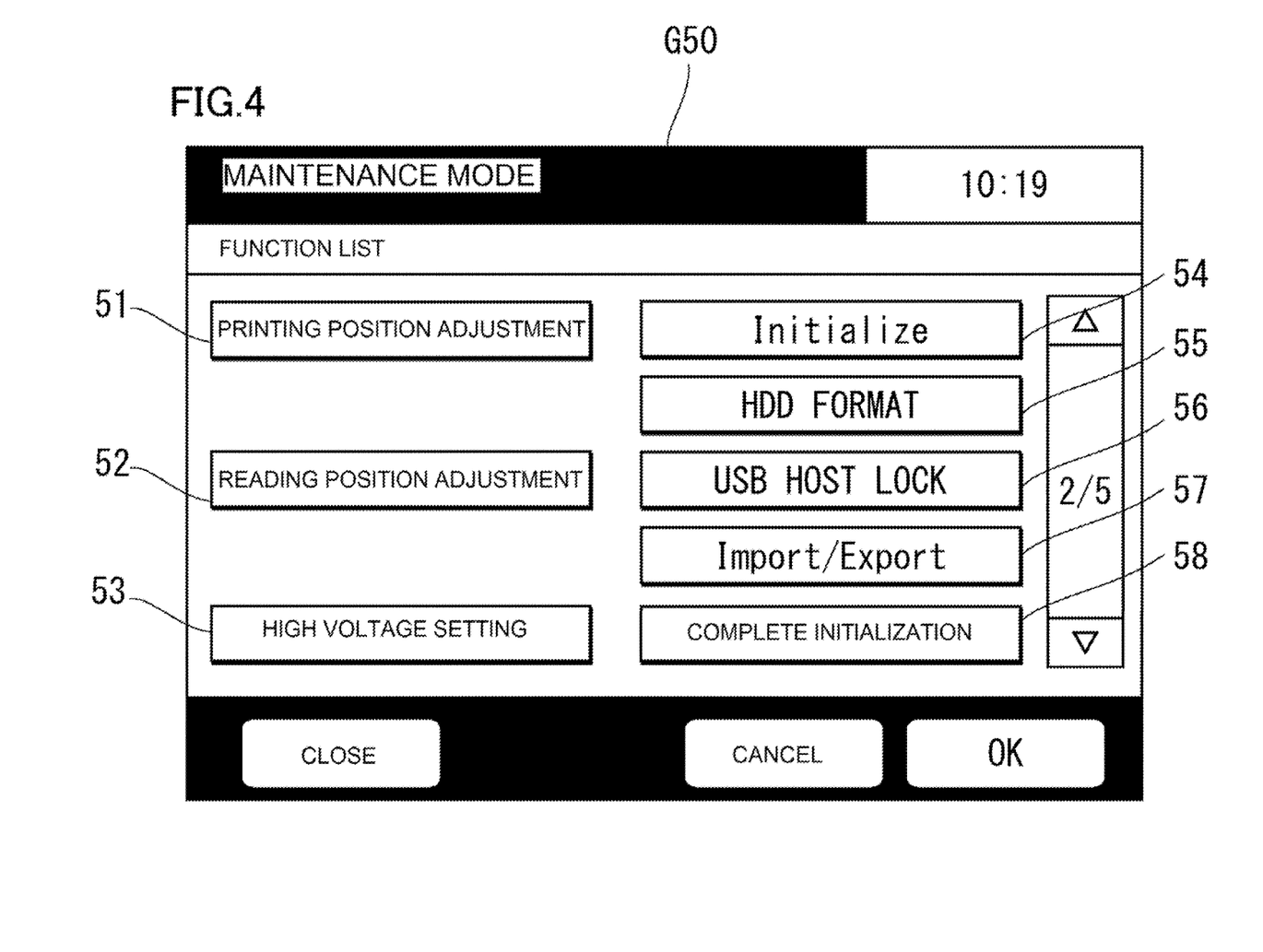
FIG. 4 illustrates an example of a display of a first maintenance screen.

FIG. 4 illustrates an example of a first maintenance screen. Printing position adjustment 51, reading position adjustment 52, high voltage setting 53, initialize 54, HDD format 55, USB host lock 56, import/export 57, complete initialization 58 and the like are displayed on a first maintenance screen G50.

Printing position adjustment 51, reading position adjustment 52 and high voltage setting 53 are all settings related to maintenance of image formation, and are maintenance items for adjusting the image forming apparatus 1. With the printing position adjustment 51 it is possible to adjust the printing position with respect to the printing paper in the printing unit 17. With the reading position adjustment 52 it is possible to adjust the reading position with respect to the document image in the document reading unit 14. With the high voltage setting 53 it is possible to adjust the density of printing by setting a bias voltage in the image forming apparatus 1.

Initialize 54, HDD format 55, USB host lock 56, import/export 57 are all settings related to security. With initialize 54 it is possible to initialize the user setting values, and the security settings are also initialized. With HDD format 55 it is possible to perform initialization of the entire storage unit 15, and there is a possibility that a maintenance worker could delete confidential information that is stored in the storage unit 15. With USB host lock 56 it is possible to enable or disable connection of USB memory to the image forming apparatus 1. With import/export 57 it is possible to read setting values from an external device or to write setting values to an external device.

A maintenance worker can set up the image forming apparatus 1 by performing initialization using initialize 54 and HDD format 55, or by causing the image forming apparatus 1 to read setting values for an initial program or initial settings by using USB host lock 56 or import/export 57.

Complete initialization 58 is a setting for performing complete initialization to restore the image forming apparatus 1 to the state of the factory settings, and is not a setting related to security. By initializing the image forming apparatus 1 to the factory settings, security settings are also initialized, however, the confidential information of the user is also initialized so there is no problem with security.

By using the first maintenance screen G50, a maintenance worker is able to set up the image forming apparatus 1 so that the image forming apparatus 1 can be handed over to a user. After the set up work is completed, the maintenance worker can hand over (deliver) the image forming apparatus 1 to the user.

After the image forming apparatus 1 has been handed over, the user sets by way of the setting receiver 181 an administrator user that has administration authority, and sets the security settings of the image forming apparatus 1. As a result, security measures such as the prevention of leakage of confidential information take effect, and a security environment of the image forming apparatus 1 is established. It is also possible for a maintenance worker to hand over the image forming apparatus 1 to a user after setting an administrator user and performing security settings as the administrator user by way of the setting receiving unit 181.

When it becomes time to perform periodic maintenance or the like of the image forming apparatus 1, the maintenance worker logs in to the image forming apparatus 1 by using the password for maintenance work again (step s11). At this time, the administrator user setting is set for the image forming apparatus 1 (No in step S12), so the setting receiving unit 181 prohibits receiving settings related to security (step s15). This is done in order that the security environment of the operating image forming apparatus 1 is not disturbed and so that the level of security is not reduced due to maintenance work by the maintenance worker.

Continuing, the setting receiving unit 181 references the usage permission table 151, and determines whether or not permission to use the image forming apparatus 1 has been set by the administrator user (step s16). Depending on the maintenance contents, for example a firmware update or the like, it may be necessary to perform maintenance using settings related to security that are prohibited from being received. In such a case, the administrator manager can, by way of the setting receiving unit 181, allow the maintenance worker when necessary to temporarily use settings related to security that are prohibited from being received.

Figure 5:
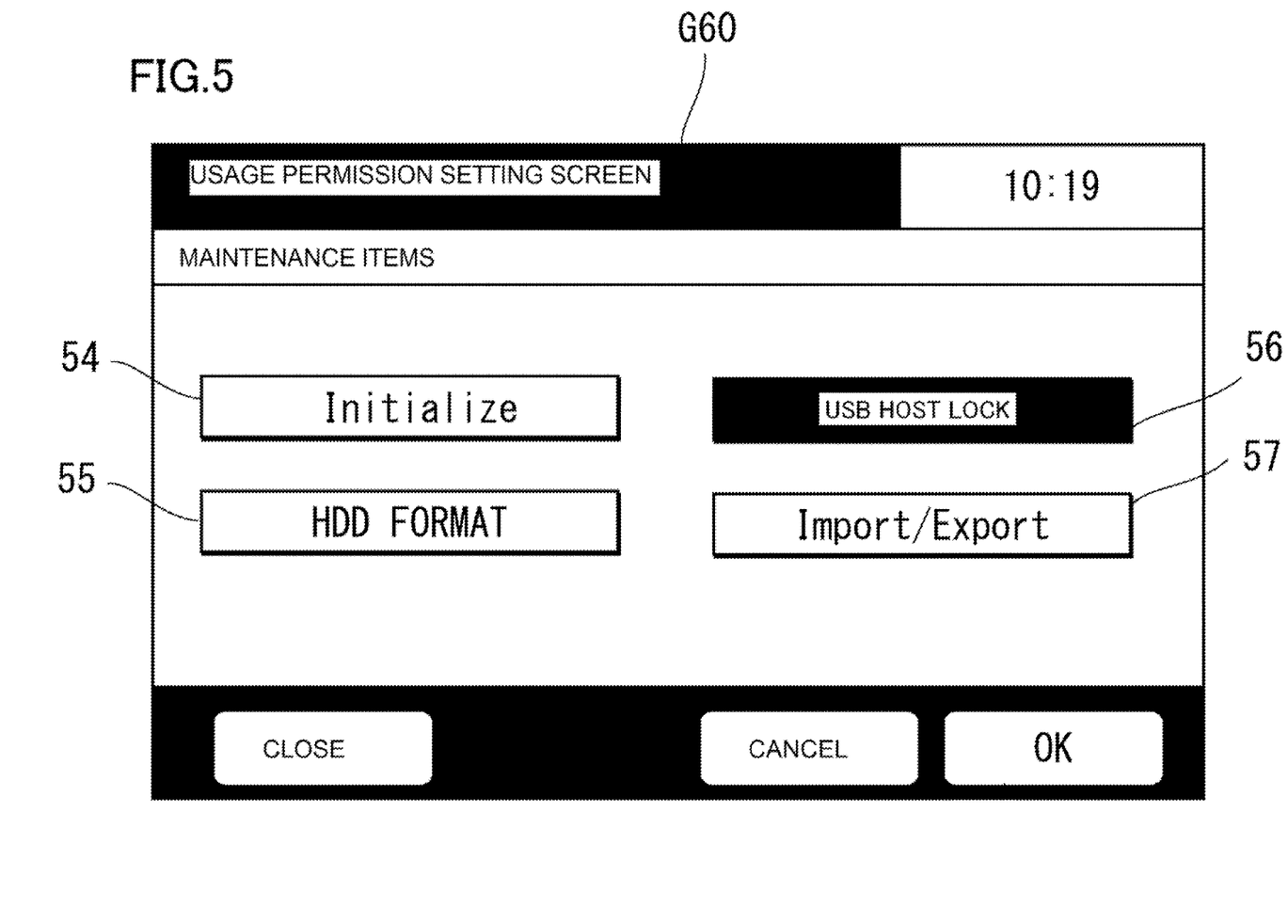
FIG. 5 illustrates an example of a display of a usage permission setting screen.
Figure 6:
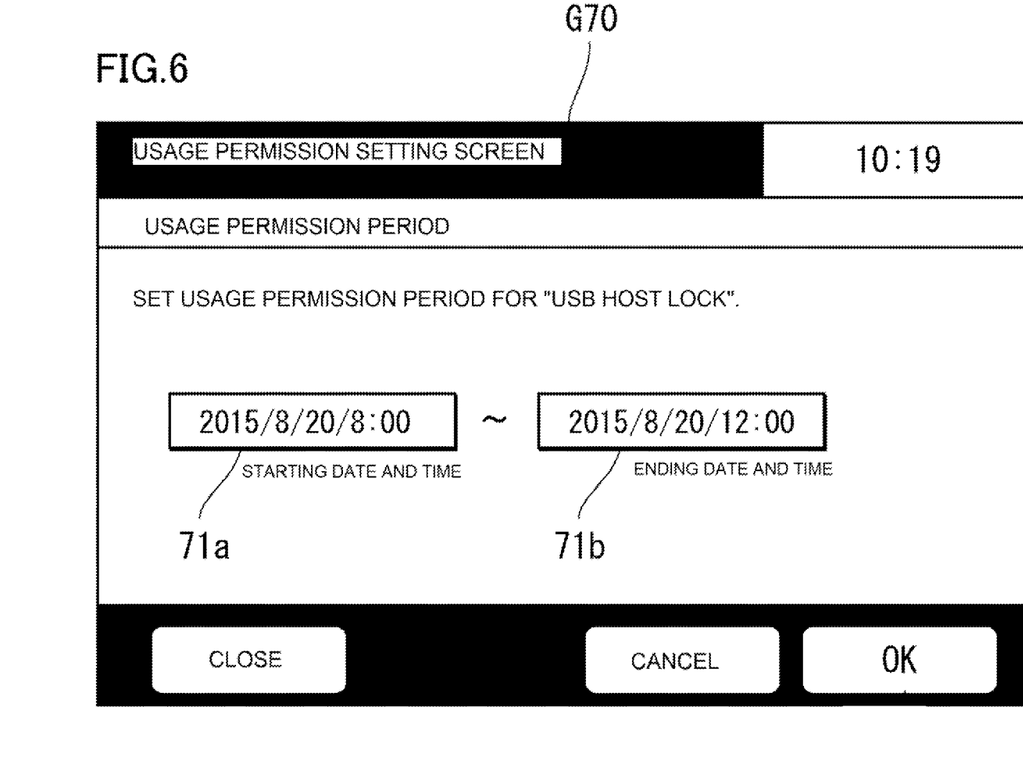
FIG. 6 illustrates an example of a display of a usage permission period setting screen.

FIG. 5 illustrates an example of a display of a usage permission setting screen G60 for allowing usage of settings that are prohibited from being received. Here, the settings that are prohibited from being received are initialize 54, HDD format 55, USB host lock 56, and import/export 56. When the administrator user selects a setting for which usage is to be allowed and then presses the OK button, a usage permission period setting screen G70 as illustrated in FIG. 6 is displayed.

On the usage permission period setting screen G70 it is possible to set a period for allowing usage of settings for which usage is allowed. Here, the starting date and time 71a and the ending date and time 71b can be set, and the period from the set starting date and time 71a to the ending date and time 71b is set as the usage permission period. It is also possible to set the power ON/OFF timing such as from the next time the power is turned ON until the power is turned OFF as the timing for starting and ending the usage permission period. By setting a usage permission period in this way, it is possible to allow a maintenance worker to use settings related to security for a period necessary for maintenance. After the usage permission period has been set, settings for which usage is allowed and the usage permission period are registered in the usage permission table 151 by the setting receiving unit 181. It is possible to set more than one setting for which usage is to be allowed.

Figure 7:
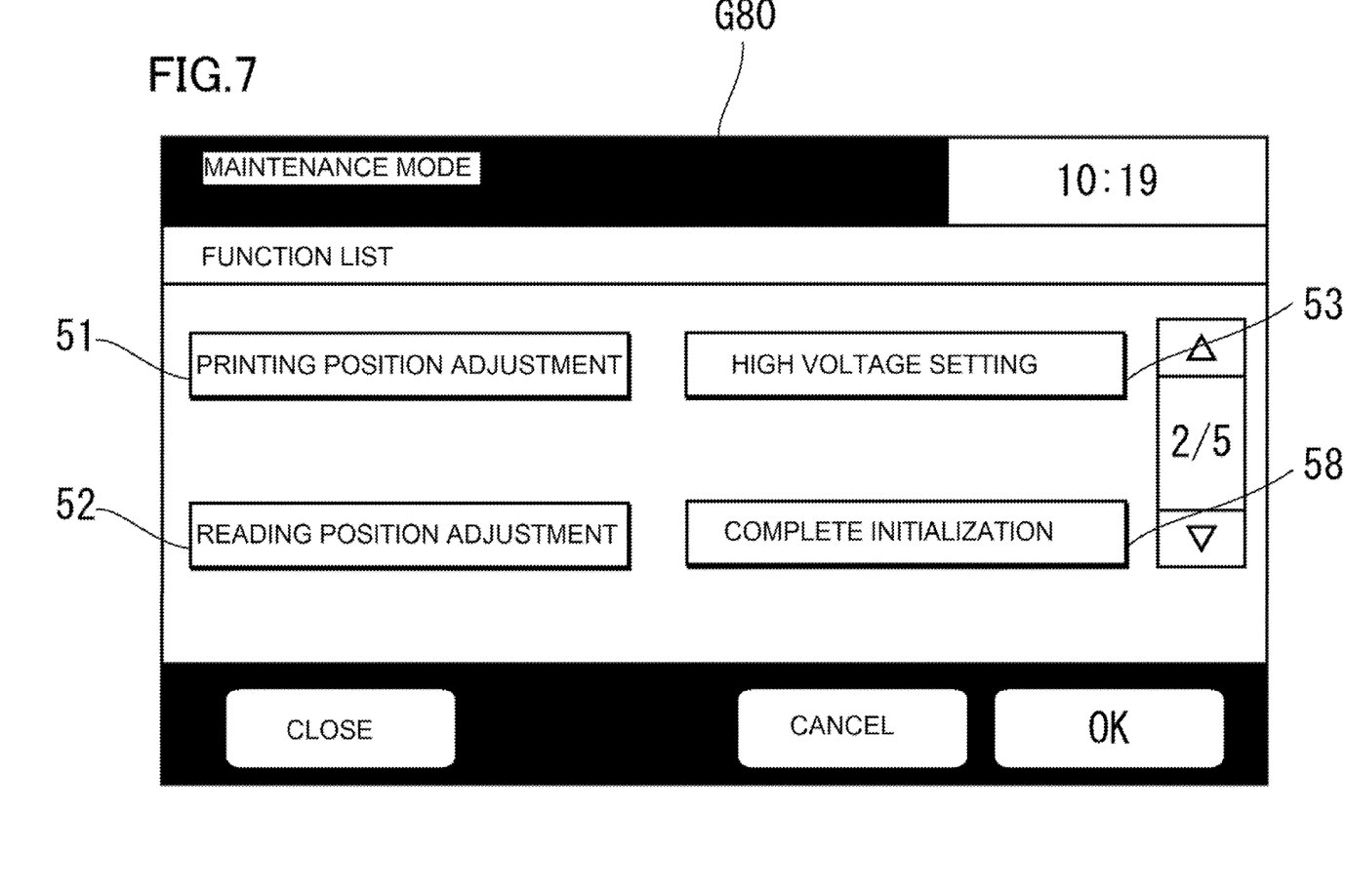
FIG. 7 illustrates an example of a display of a second maintenance screen.

When there are no settings for which usage is to be allowed (No in step s16), the setting receiving unit 181 causes a second maintenance screen G80 to be displayed on which receiving settings related to security is prohibited (step s17), and then ends this process.

FIG. 7 illustrates an example of a display of a second maintenance screen G80. Printing position adjustment 51, reading position adjustment 52 and high voltage setting 53 that are settings related to maintenance of image formation, and a complete initialization 58 setting for completely initializing the apparatus to the factory settings are displayed on the second maintenance screen G80. Here, settings related to security that are prohibited from being received are not displayed on the second maintenance screen, however, those settings could be displayed in a grayed out non-operable state.

On the second maintenance screen G80, settings related to security cannot be used, however, it is possible to use settings related to maintenance of image formation, so periodic maintenance can be performed. However, because it is not possible to use settings related to security, it is possible to prevent a maintenance worker from unintentionally affecting the security environment during periodic maintenance.

The complete initialization 58 setting that is a setting for complete initialization to the factory setting state is a setting for completely initializing the apparatus and redoing all settings in the case that the administrator user forgets the administrator password. By initializing the apparatus to the factory setting state, all confidential information is lost, so there is no problem with security even when security settings that were set by the administrator user are initialized. By performing complete initialization to the factory setting state, the administrator user setting are also initialized to be unset. Therefore, when a maintenance worker logs in after the apparatus has been initialized to the factory setting state, the first maintenance screen G50 that allows all settings to be received is displayed, and it is possible again to set up the image forming apparatus 1.

Figure 8:
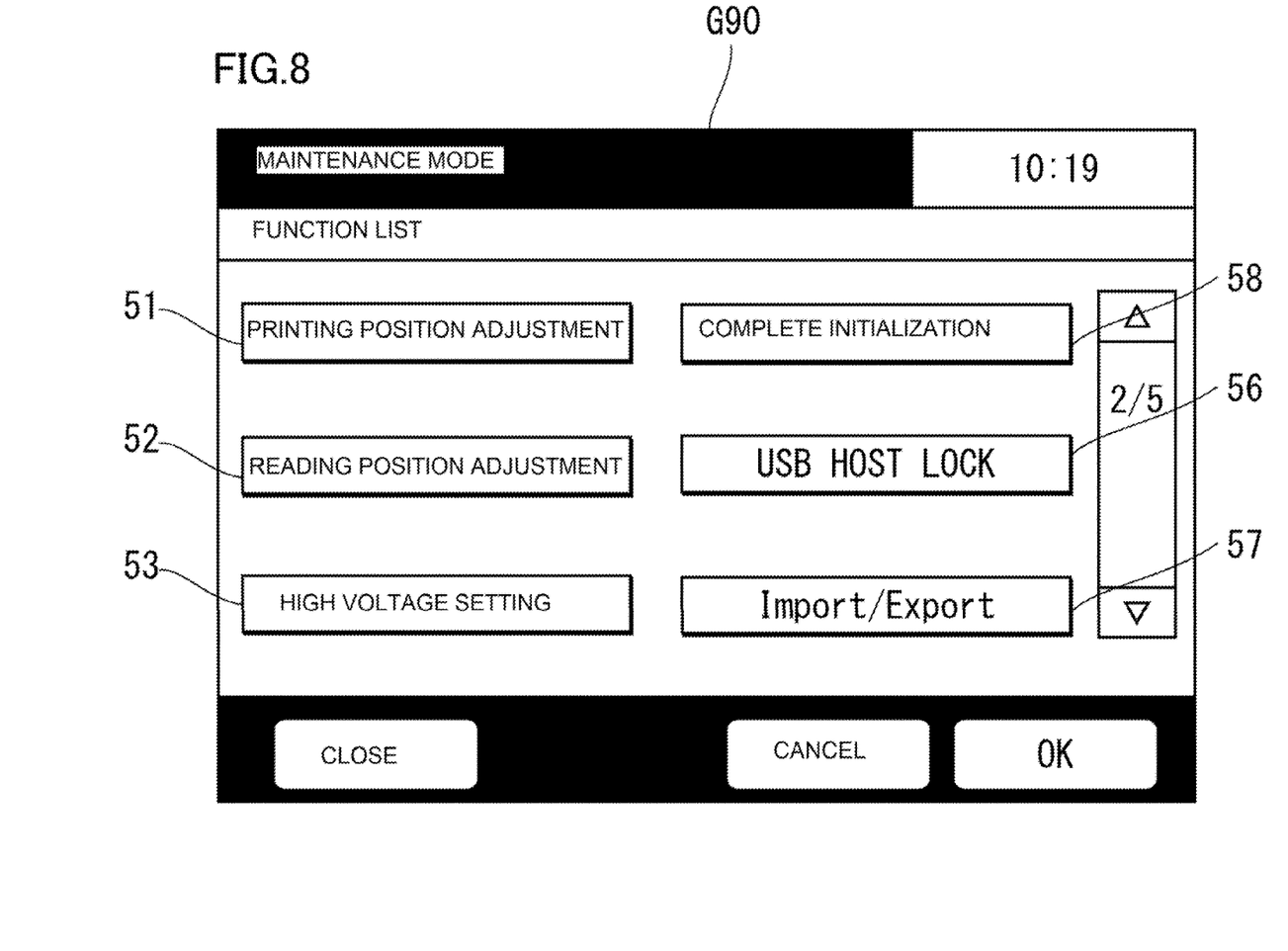
FIG. 8 illustrates an example of a display of a third maintenance screen.

However, when there are settings for which usage is allowed (Yes in step s16), the setting receiving unit 181 causes a third maintenance screen G90 to be displayed that, of the settings for which reception was determined to be prohibited, cancels prohibition of receiving settings for which usage is allowed (step s18), and then ends this process.

FIG. 8 illustrates an example of a display of a third maintenance screen G90. The third maintenance screen G90 is a screen on which settings for which usage is allowed are additionally displayed on the second maintenance screen G80. Here, USB host lock 56 and import/export 57 that are settings registered in the usage permission table 151 are displayed on the third maintenance screen G90 as settings that can be used. Of the settings for which reception was determined to be prohibited, settings for which usage is not allowed remain in the unusable state.

When maintenance is performed by way of the third maintenance screen G90, there is a possibility that the security environment of the image forming apparatus 1 could change. However, settings that are displayed on the third maintenance screen G90 that are related to security are settings for which usage by a maintenance worker was allowed beforehand by the administrator user. Therefore, the administrator user knows that maintenance that could change the security environment is being performed. The administrator user is able to back up confidential information beforehand, and restore the security environment after the maintenance work.

In this way, the image forming apparatus 1 of this embodiment has a setting receiving unit 181 that receives settings such as settings related to maintenance of image formation, settings related to security and an administrator user setting. When the administrator user setting is unset, this setting receiving unit 181 receives all settings by a maintenance worker, and when the administrator user setting is set, settings related to security by a maintenance worker are prohibited from being received. Therefore, it is possible for a maintenance worker to change all settings during set up, so set up work can be performed efficiently. However, settings related to security by a maintenance worker during periodic maintenance are prohibited from being received, so there is no need to worry that the security environment will be changed during maintenance work.

With typical technology, a maintenance worker had the authority to be able to change all settings in order to set up the image forming apparatus, so there was a possibility that security settings that were set by an administrator user could be changed unintentionally during periodic maintenance work. Therefore, there was a possibility that the security environment of the image forming apparatus could be changed without the administrator user noticing.

However, according to the present disclosure, it is possible to prevent the security environment of the image forming apparatus from being changed due to maintenance work without the administrator user noticing.

The present disclosure is not limited to the embodiment described above, and various changes and modifications are possible within the scope and range of the disclosure.

What is claimed is:

1. An image forming apparatus that performs image formation, comprising:
   a setting receiving unit that receives settings related to maintenance of the image formation, settings related to security, and an administrator user setting; wherein
   the setting receiving unit
   receives all of the settings by a maintenance worker when the administrator user setting is unset, and prohibits receiving settings related to security by the maintenance worker when the administrator user setting is set.

2. The image forming apparatus according to claim 1, wherein
   when there are settings related to security for which an instruction was given beforehand by the administrator user to allow usage,
   the setting receiving unit
   cancels prohibition of reception of the settings related to security for which an instruction was given to allow usage.

3. The image forming apparatus according to claim 2, wherein
   the setting receiving unit
   cancels prohibition of reception of the settings related to security for which an instruction was given to allow usage during a usage permission period that was set beforehand.

4. The image forming apparatus according to claim 1, wherein
   when the administrator user setting is set,
   the setting receiving unit
   receives a setting for completely initializing the image forming apparatus to the factory setting state, and receives settings related to maintenance of the image formation.

5. An image forming method whereby an image forming apparatus performs image formation by a setting receiving unit receiving settings related to maintenance of the image formation, settings related to security, and an administrator user setting;
   in the image forming method
   the setting receiving unit
   determines whether or not the administrator user setting is unset,
   receives all of the settings by a maintenance worker when it is determined that the administrator user setting is unset, and
   prohibits receiving settings related to security by the maintenance worker when it is determined that the administrator user setting is set.

* * * * *